(12) United States Patent
Onaka et al.

(10) Patent No.: US 7,725,032 B2
(45) Date of Patent: May 25, 2010

(54) OPTICAL TRANSMISSION APPARATUS

(75) Inventors: Miki Onaka, Kawasaki (JP); Yasushi Sugaya, Kawasaki (JP); Hiroki Ooi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1130 days.

(21) Appl. No.: 11/319,371

(22) Filed: Dec. 29, 2005

(65) Prior Publication Data
US 2006/0222367 A1    Oct. 5, 2006

(30) Foreign Application Priority Data
Mar. 29, 2005    (JP) ............................... 2005-096531

(51) Int. Cl.
*H04B 10/12* (2006.01)
*H04B 10/08* (2006.01)
*H04J 14/02* (2006.01)

(52) U.S. Cl. .............................. 398/81; 398/33; 398/92; 398/147; 398/157; 398/159

(58) Field of Classification Search .................. 398/30, 398/31, 33, 37, 81, 83, 92, 94, 147–149, 398/157, 159
See application file for complete search history.

(56) References Cited

U.S. PATENT DOCUMENTS

| 6,985,283 | B1 * | 1/2006 | Islam et al. .................. 359/334 |
| 7,110,166 | B2 * | 9/2006 | Onaka et al. ................. 359/334 |
| 7,221,821 | B2 * | 5/2007 | Eldada ......................... 385/24 |
| 2002/0015207 | A1 | 2/2002 | Ooi et al. |
| 2002/0034357 | A1 | 3/2002 | Desthieux et al. |
| 2002/0044324 | A1 * | 4/2002 | Hoshida et al. .............. 359/179 |
| 2003/0189750 | A1 * | 10/2003 | Islam et al. .................. 359/334 |
| 2005/0179990 | A1 | 8/2005 | Oguri et al. |

FOREIGN PATENT DOCUMENTS

| JP | 2001-284689 | 10/2001 |
| JP | 2002-26821 | 1/2002 |
| JP | 2002-185407 A | 6/2002 |
| JP | 2004-104051 | 4/2004 |
| JP | 3589974 B2 | 8/2004 |
| WO | 99/66607 | 12/1999 |

OTHER PUBLICATIONS

Chinese Office Action issued on Apr. 3, 2009 in corresponding Chinese Patent Application 2006100035044.
Japanese Office Action mailed Dec. 8, 2009 in corresponding Japanese Patent Application 2005-096531.

* cited by examiner

*Primary Examiner*—Dalzid Singh
(74) *Attorney, Agent, or Firm*—Staas & Halsey LLP

(57) ABSTRACT

An optical transmission apparatus includes an optical add drop multiplexer (OADM) that adds/drops an optical signal to/from a transmission path. The optical transmission apparatus further includes a pump light multiplexer and a dispersion compensation fiber that are located downstream of the OADM on the transmission path. The optical transmission apparatus is configured to house a pump light source connectable to the pump light multiplexer to Raman amplify an optical signal in the dispersion compensation fiber.

15 Claims, 11 Drawing Sheets

OPTICAL TRANSMISSION APPARATUS

CROSS-REFERENCE TO RELATED APPLICATIONS

This application is based upon and claims the benefit of priority from the prior Japanese Patent Application No. 2005-096531, filed on Mar. 29, 2005, the entire contents of which are incorporated herein by reference.

BACKGROUND OF THE INVENTION

1. Field of the Invention

The present invention relates to an optical transmission apparatus for a large-capacity and long-distance optical transmission system.

2. Description of the Related Art

Along the development of a multimedia network, demand for communication traffic is increasing dramatically, and a transmission system that carries out multiple relay and amplification of an optical signal using an optical amplifier plays an important role of economizing a communication system in a multimedia society.

Recently, a wavelength division multiplexing (WDM) system is actively introduced in a metro core network in which cost and size are important factors. A synchronous optical network add drop multiplexer (SONET ADM) that is used as a conventional optical transmission apparatus in a ring network is now being replaced with an optical add drop multiplexer (OADM) system using an OADM device having a protection function.

FIG. 10 is a configuration diagram of a network of the OADM system. An OADM system 1000 consisting of a ring network has plural (m) nodes n (n1 to nm) on a transmission path 1001, and each node has an OADM 1002. The OADM 1002 drops an optical signal having an optional wavelength to the transmission path 1001, and adds an optical signal having an optional wavelength from the transmission path 1001 to the OADM 1002. Usually, the OADM 1002 disposed in each node n (n1 to nm) has optical amplifiers that compensate for an insertion loss of an optical signal of the OADM at a pre-stage and a post-stage of the OADM 1002. Specifically, a pre-amplifying unit 1003 is provided at the pre-stage, and a post-amplifying unit 1004 is provided at the post-stage of the OADM 1002.

At the time of initially introducing the OADM system 1000, the introduction cost is required to be minimized. Thereafter, when the demand for metro communication traffic increases, a function of the OADM system 1000 is required to be expanded (upgraded). It is required that a part of the provided function can be used at the initial operation period of the system, and that thereafter the function can be sequentially expanded to meet requirements for a long communication distance and a large capacity.

To smoothly upgrade the function, an optical circuit configuration that can be upgraded at least without changing the optical circuit of a main signal system is required. The optical circuit should have a configuration in which optical parts can be increased at the subsequent upgrading time for reducing the initial introduction cost. For example, there is a method in which at the initial introduction time, only a rare-earth-doped optical fiber amplifier is used as an optical amplifier by anticipating the upgrading, and in which optical signals in a transmission path and a dispersion compensation fiber are Raman amplified at the subsequent upgrading time.

The upgrading is specifically carried out based on requirements for increasing a ring size (increase in the number of nodes, and increase in the length of a transmission path), and increasing capacity (upgrading of a bit rate, and expansion of a signal band). In carrying out the upgrading to meet the requirements for a large capacity and a long distance, noise characteristic expressed by an optical signal to noise ratio (OSNR) in each node n (n1 to nm) needs to be improved based on elements such as the increase in a bit rate and the increase in a ring size.

For example, in the transmission system including the OADM 1002 disposed in each of the nodes n1 to nm of the OADM system 1000, a technique of improving the OSNR in each node n (n1 to nm) is also used to meet the requirement for upgrading (for example, see Japanese Patent Publication No. 3589974). To increase the transmission distance, it is effective to provide an optical amplifier that can increase the OSNR. The OSNR is defined by an input optical power level of a medium that generates noise light and a noise figure NF (OSNR=input optical power level (−) noise figure NF (−) 10 log(h·v·Δf)). In other words, to improve the OSNR, it is necessary to increase the input optical power level of the medium that generates noise light or reduce the noise figure NG of the noise medium.

FIG. 11 is a configuration diagram of a conventional optical transmission apparatus in an OADM system. A configuration of one node n (n1 to nm) is shown in FIG. 11. In a node 1100, the transmission path 1001, the pre-amplifying unit 1003, the OADM 1002, and the post-amplifying unit 1004 are disposed in this order from the upstream (left side). The OADM 1002 optionally adds or drops an optical signal that is wavelength-multiplexed on the transmission path 1001. The pre-amplifying unit 1003 and the post-amplifying unit 1004 are provided at the input side and the output side respectively of the OADM 1002 to compensate for an insertion loss of the optical signal by the OADM 1002.

A dispersion compensation fiber 1111 provided in the pre-amplifying unit 1003 compensates for degradation in the transmission characteristic of a wavelength-multiplexed optical signal generated due to a difference in the transmission speed of the wavelength-multiplexed optical signal for each wavelength. In the OADM system 1000 (see FIG. 10), in general, each node 1100 has the dispersion compensation fiber 1111 from the viewpoint of dispersion management.

The pre-amplifying unit 1003 compensates for a large amount of dispersion when the transmission path 1001 has a long length (for example, 80 kilometers). The insertion loss of an optical signal in the dispersion compensation fiber 1111 also increases (for example, 10 decibels) accordingly. To avoid degradation in the OSNR due to the insertion loss when the dispersion compensation fiber 1111 is disposed, the pre-amplifying unit 1003 has two optical amplifiers 1112a and 1112b, and has the dispersion compensation fiber 1111 between these optical amplifiers 1112a and 1112b. An erbium-doped fiber amplifier (EDFA) is used for the optical amplifiers 1112a and 1112b. Photodetectors 1113c and 1113d of each optical amplifier detect received optical power via add drop multiplexing units 1113a and 1113b. A controller 1113e controls gains or outputs of the optical amplifiers 1112a and 1112b based on the detected received optical power.

Since the OADM 1002 controls the optical output at a constant level, a simple optical amplifier having a fixed gain, that is, a simple optical amplifier 1121 excluding the function of a variable optical attenuator (VOA), is used in the post-amplifying unit 1004. This optical amplifier 1121 also consists of an EDFA, and includes the add drop multiplexing units 1113a and 1113b, the photodetectors 1113c and 1113d, and the controller 1113e, like the optical amplifiers 1112a and 1112b. The controller 1113e controls a gain or an output of the optical amplifier 1121 based on the detected received optical power.

It is known that Raman amplification of an optical signal in the transmission path 1001 and the dispersion compensation fiber 1111 is effectively carried out to upgrade for larger capacity and the longer distance. Therefore, Raman amplification pump light multiplexers 1114a and 1114b are prepared in advance on the transmission path of the main signal from the initial stage of the introduction of the OADM system 1000. At the upgrading time, Raman amplification pump light sources 1115a and 1115b are provided additionally, thereby executing Raman amplification. A WDM coupler is used for the pump light multiplexers 1114a and 1114b.

A variable optical attenuator (VOA) 1116 is provided at the input side of the pre-amplifying unit 1003. The variable optical attenuator 1116 is provided to automatically compensate for an optical power component extracted from an input dynamic range in the pre-amplifying unit 1003 when the transmission path 1001 has a short length. Since the transmission path 1001 has various lengths to meet the requirement of system users, it is necessary to broadly compensate for a loss of transmission length.

However, the above OADM system 1000 cannot meet the requirement for a large improvement in the OSNR at the time of expanding the function (upgrading).

The requirement for the improvement in the OSNR cannot be met because noise light of the optical amplifiers is accumulated along the increase in the number of the nodes 1100, thereby degrading the OSNR. When the length of the transmission path 1001 increases, transmission path loss increases, thereby degrading the OSNR. When the capacity is increased by upgrading the bit rate, the increased bit rate expands the optical signal spectrum, and the noise component increases, thereby degrading the OSNR. When the capacity is increased by expanding the signal band, the Raman amplification of an optical signal in the transmission path 1001 and the increased compensation of gain deviation degrade the OSNR.

According to the conventional configuration of the node 1100 shown in FIG. 11, the dispersion compensator (the dispersion compensation fiber) 1111 is disposed in the pre-amplifying unit 1003. According to this layout configuration, at the initial introduction time, due to the insertion loss of an optical signal in the dispersion compensation fiber 1111, to avoid degradation in the OSNR in the pre-amplifying unit 1003, the pre-amplifying unit 1003 requires the two stages of the optical amplifiers 1112a and 1112b. This complicates the configuration of the optical circuit.

At the upgrading time, the OSNR increases in only the pre-amplifying unit 1003, and this is not effective to improve the OSNR. Specifically, the Raman amplification of an optical signal in the transmission path 1001 and the dispersion compensation fiber 1111 in the above configuration only increases the input level in the pre-amplifying unit 1003. Therefore, only the OSNR in the pre-amplifying unit 1003 can be improved. To effectively improve the OSNR, it is necessary to improve the OSNR in both the pre-amplifying unit 1003 and the post-amplifying unit 1004. Consequently, the OSNR cannot be improved effectively in the above configuration.

Regarding the number of optical amplifiers, it is necessary to meet the required system gain width with a smaller number of optical amplifiers. The length of transmission paths of users ranges from long to short. Therefore, there is a range in system gains that are to be supported by optical amplifiers. Optical amplifiers that can be used for wavelength division multiplexed lights are expensive. The configuration in which plural optical amplifiers 1112a, 1112b, and 1121 are provided as shown in FIG. 11 increases cost. When the transmission path 1001 has a short length, the variable optical attenuator 1116 is provided at the input side of the pre-amplifying unit 1003 to reduce the number of menus of the optical amplifiers. With this arrangement, the optical power level exceeding the input dynamic range in the pre-amplifying unit is automatically compensated for. The number of menus means the number of optical amplifiers having different characteristics corresponding to the input power and the like. Optical amplifiers are selected from among those having different characteristics. In this case, the OSNR in the pre-amplifying unit 1003 is degraded due to the insertion loss of an optical signal attributable to the disposition of the variable optical attenuator 1116.

There is an example in which the dispersion compensation fiber 1111 is used for a variable dispersion compensator. However, an optical circuit configuration that effectively increases the OSNR is not provided. In the configuration according to the conventional technique, loss variation in both the transmission path 1001 and the dispersion compensation fiber 1111 is absorbed based on only the configuration at the pre-amplifying unit 1003 side. At the upgrading time, distribution Raman amplification is carried out to the transmission path 1001, and concentrated Raman amplification of an optical signal is carried out in the dispersion compensation fiber 1111, thereby increasing the OSNR in only the pre-amplifying unit 1003.

In the Raman amplification of an optical signal in the dispersion compensation fiber 1111 provided in the pre-amplifying unit 1003, the Raman amplification is carried out at a high level of optical power input to the dispersion compensation fiber 1111. Therefore, a waveform (an eye pattern) of an optical signal collapses, and nonlinearity degrades the transmission characteristics. Further, due to the insertion loss (about a few decibels, in general) attributable to the provision of the variable optical attenuator 1116, the OSNR in the pre-amplifying unit 1003 is degraded.

Within the node 1100, the pre-amplifying unit 1003 operates at a high rate to recover the loss and to improve the OSNR at the pre-amplifying unit 1003 side. Therefore, the optical circuit has a complex configuration in the pre-amplifying unit 1003. Since the OSNR is determined obviously in both the post-amplifying unit 1004 and the pre-amplifying unit 1003, it is difficult to substantially improve the OSNR according to the method of increasing the OSNR only in the pre-amplifying unit 1003.

SUMMARY OF THE INVENTION

It is an object of the present invention to at least solve the problems in the conventional technology.

An optical transmission apparatus according to an aspect of the present invention includes an optical add drop multiplexer (OADM) that adds/drops an optical signal to/from a transmission path. The optical transmission apparatus includes: a pump light multiplexer that is located downstream of the OADM on the transmission path; and a dispersion compensation fiber that is located downstream of the OADM on the transmission path. The optical transmission apparatus is configured to house a pump light source connectable to the pump light multiplexer to Raman amplify an optical signal in the dispersion compensation fiber.

An optical transmission apparatus according to another aspect of the present invention includes: an optical add drop multiplexer (OADM) that adds/drops an optical signal to/from a transmission path; a pre-amplifying unit that is located upstream of the OADM on the transmission path and includes a first pump light multiplexer; and a post-amplifying unit that is located downstream of the OADM on the transmission path and includes a second pump light multiplexer and a dispersion compensation fiber. The pre-amplifying unit is configured to house a first pump light source connectable to the first pump light multiplexer to Raman amplify an optical signal on the transmission path. The post-amplifying unit is configured to house a second pump light source connectable to the second pump light multiplexer to Raman amplify an optical signal in the dispersion compensation fiber.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of an optical transmission apparatus according to the present invention will be explained in detail below with reference to the accompanying drawings.

Figure 1A:
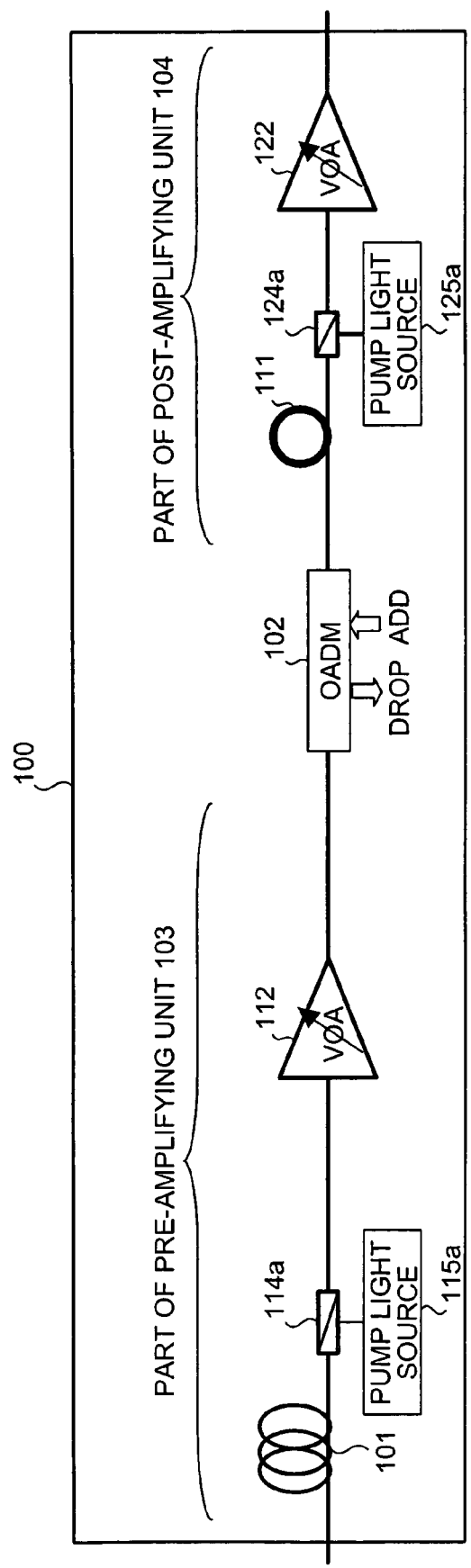
FIG. 1A is a configuration diagram of an optical transmission apparatus when a pump light source is disposed at a post-stage of a dispersion compensation fiber according to a first embodiment of the present invention.
Figure 10:
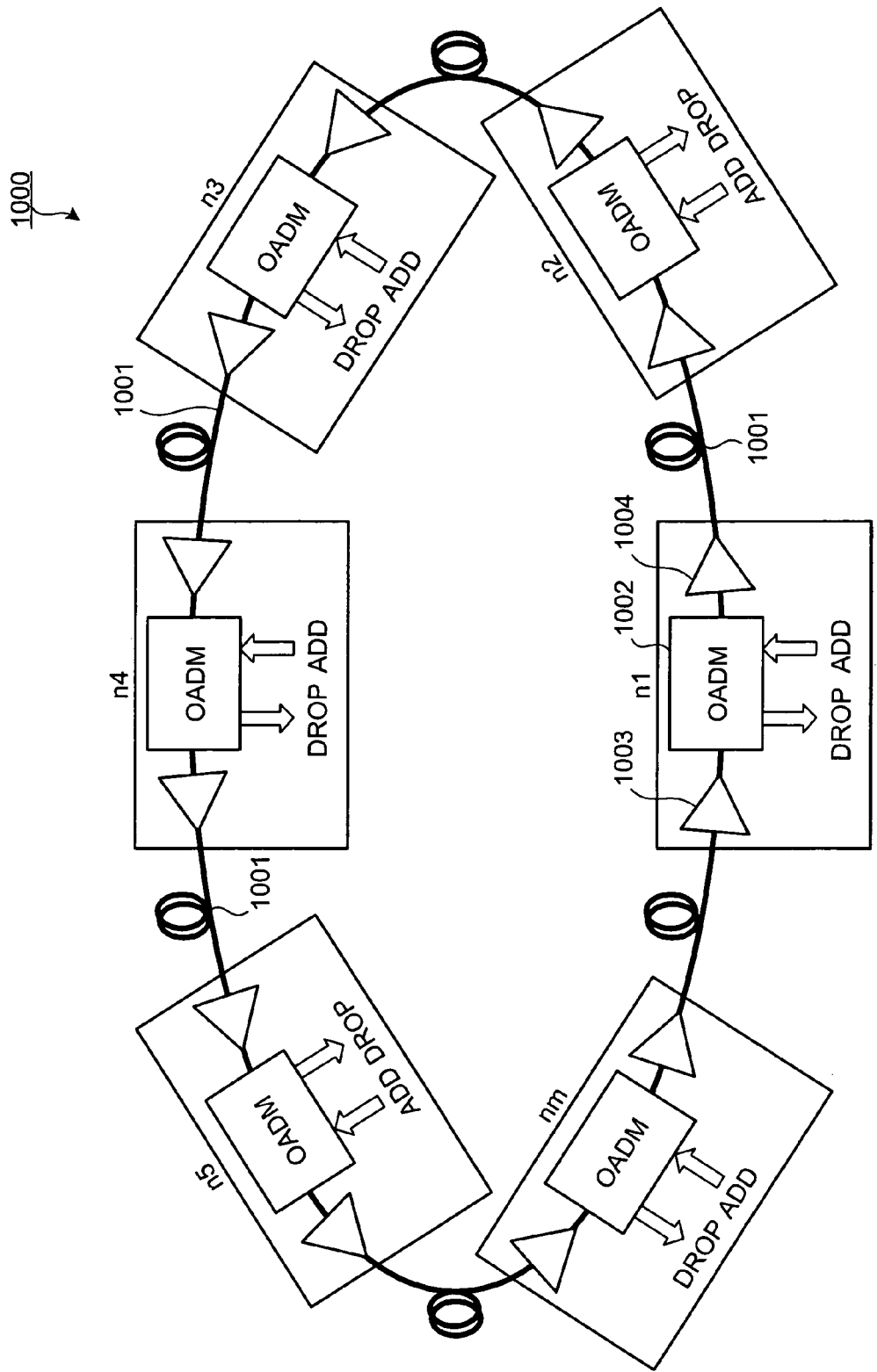
FIG. 10 is a configuration diagram of a network of an OADM system.

FIG. 1A is a configuration diagram of an optical transmission apparatus when a pump light source is disposed at a post-stage of a dispersion compensation fiber according to a first embodiment of the present invention. FIG. 1A depicts the configuration of one node n (any one of the nodes n1 to nm) in the OADM system shown in FIG. 10. A transmission path 101, a pre-amplifying unit 103, an OADM 102, and a post-amplifying unit 104 are disposed in this order from the upstream (left side) in a node 100.

The OADM 102 optionally drops a wavelength-multiplexed optical signal from the transmission path 101, or adds a wavelength-multiplexed optical signal to the transmission path 101 to the OADM 102. While arrayed waveguide gratings (AWGs) are conventionally used, a wavelength selective switch (WSS) is used recently. When this WSS is used, the insertion loss in the OADM 102 can be decreased substantially as described in detail later.

The pre-amplifying unit 103 includes a pump light multiplexer 114a and an optical amplifier 112 that are disposed on a transmission path of a main signal. The optical amplifier includes an EDFA, and gains can be varied. At the upgrading time, a pump light source 115a for Raman amplification is connected to the pump light multiplexer 114a.

The post-amplifying unit 104 includes a dispersion compensation fiber 111, a pump light multiplexer 124a, and an optical amplifier 122. The dispersion compensation fiber 111 compensates for degradation in transmission characteristics generated due to different transmission speeds of wavelength-multiplexed optical signals depending on wavelengths. At the upgrading time, a pump light source 125a for Raman amplification is connected to the pump light multiplexer 124a. As explained above, according to the present embodiment, the dispersion compensation fiber 111 is disposed at a position different from that in the configuration shown in FIG. 11. The dispersion compensation fiber 111 is not provided in the pre-amplifying unit 103 at the input side of the OADM 102 but is provided in the post-amplifying unit 104 at the output side of the OADM 102. The post-amplifying unit 104 Raman amplifies an optical signal in the dispersion compensation fiber 111 based on the backward pump.

At the time of carrying out Raman amplification using the dispersion compensation fiber 111, a variation in the input level in the post-amplifying unit 104 needs to be absorbed. The optical amplifier 122 has a variable optical attenuator, and can vary the gain. Therefore, even when the power input to the optical amplifier 122 changes, the output power can be fixed, and the wavelength flatness of the gain can be maintained. The optical amplifier 122 of a fixed gain and a variable optical attenuator (not shown) can be combined.

Since the OSNR in the post-amplifying unit 104 can be improved by reducing the insertion loss in the OADM 102, the dispersion compensation fiber 111 can be provided in the post-amplifying unit 104. With this arrangement, the pre-amplifying unit 103 provided at the pre-stage of the OADM 102 can reduce the load of amplifying the optical signal. Consequently, the pre-amplifying unit 103 can be configured using one optical amplifier 112.

At the upgrading time, the post-amplifying unit 104 Raman amplifies an optical signal in the dispersion compensation fiber 111, and the pre-amplifying unit 103 amplifies an optical signal in the transmission path 101. Therefore, the OSNR in both the pre-amplifying unit 103 and the post-amplifying unit 104 can be increased, and the OSNR can be improved effectively.

The dispersion compensation fiber 111 is provided at the output side of the OADM 102. Due to the insertion loss in the OADM 102, the input level of an optical signal to the dispersion compensation fiber 111 is small. Therefore, the conventional problem attributable to nonlinearity can be solved.

When the variable attenuation function of the optical fiber 122 in the post-amplifying unit 104 is used, the variable optical attenuator 1116 disposed at the input side of the pre-amplifying unit 103 (see FIG. 11) can be omitted. When the optical amplifier 122 in the post-amplifying unit 104 variably attenuates an optical signal, the input level of the transmission path 101 can be reduced, and an optical power level can be accommodated within an input dynamic range in the pre-amplifying unit 103. Since the input level of the transmission path can be reduced, degradation in the transmission characteristics due to nonlinearity can be also solved. When the variable optical attenuator 1116 disposed at the input side of the pre-amplifying unit 103 is omitted, degradation in the OSNR can be solved as described in detail later.

Figure 1B:
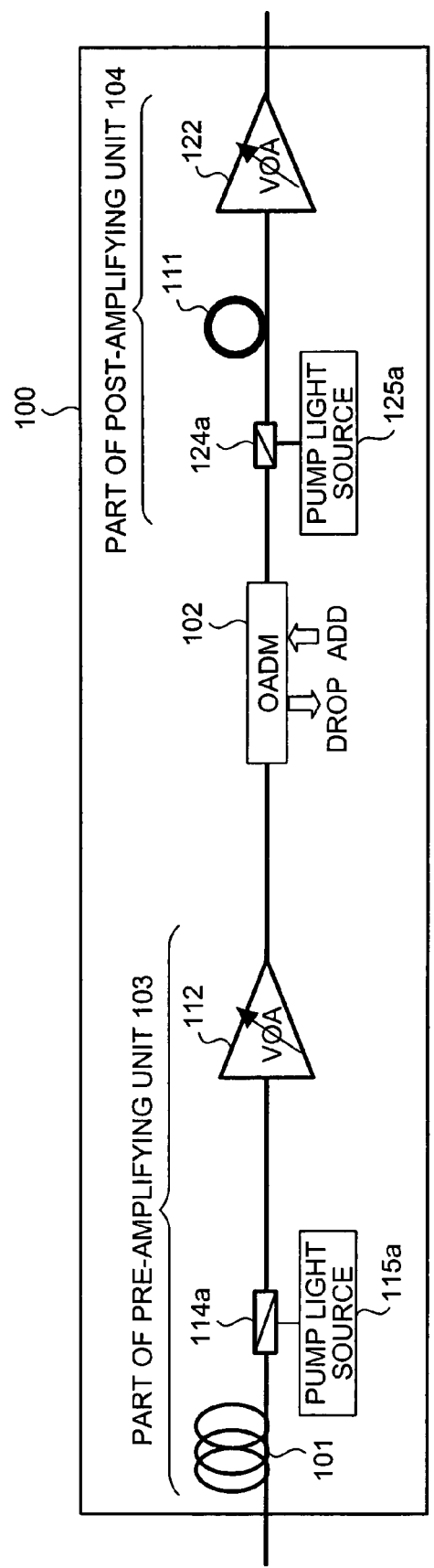
FIG. 1B is a configuration diagram of an optical transmission apparatus when a pump light source is disposed at a post-stage of a dispersion compensation fiber according to the first embodiment.

FIG. 1B is a configuration diagram of the optical transmission apparatus when a pump light source is disposed at a pre-stage of a dispersion compensation fiber according to the first embodiment. While the configuration of backward pump having the pump light source 125a disposed at the post-stage of the dispersion compensation fiber 111 is shown in FIG. 1A, the pump light source 125a can be also disposed at the pre-stage of the dispersion compensation fiber 111 as shown in FIG. 1B.

Figure 2:
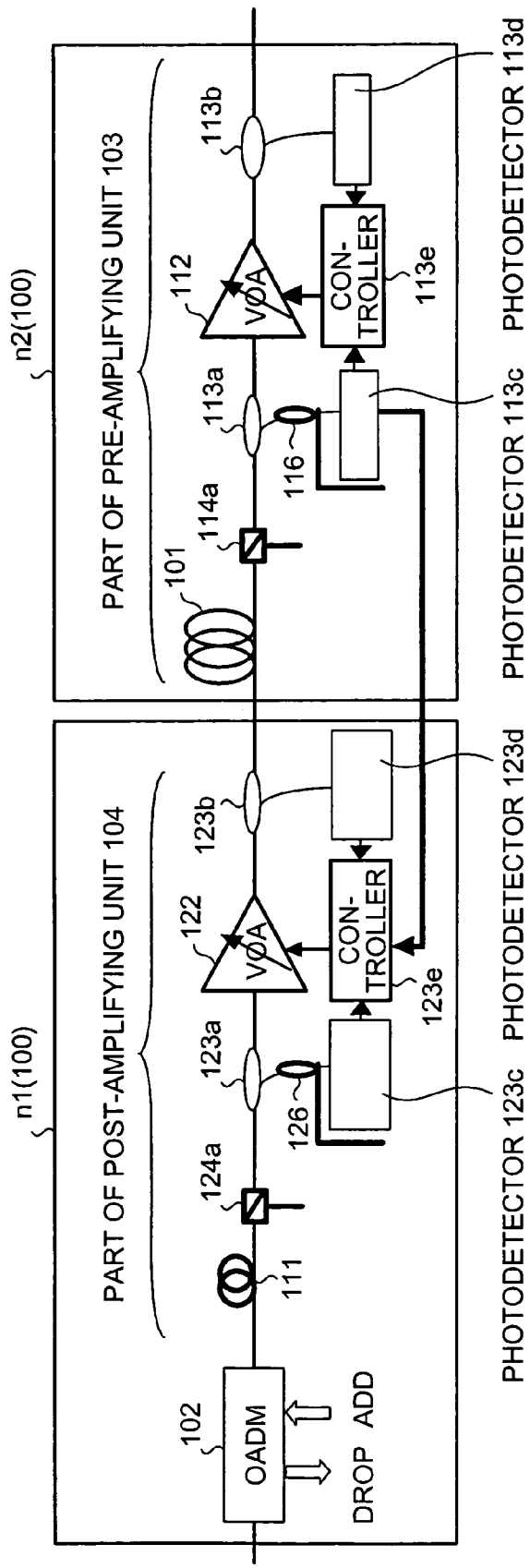
FIG. 2 is a configuration diagram of the optical transmission apparatus at an initial introduction time.

Configurations of the optical transmission apparatus before and after upgrading the optical transmission apparatus is explained with reference to FIG. 2 and FIG. 3. FIG. 2 is a configuration diagram of the optical transmission apparatus at the initial introduction time. Two adjacent nodes n1 and n2 are shown in FIG. 2. At the initial introduction time, the pump light source 125a (see FIG. 1A and FIG. 1B) is not yet connected to the pump light multiplexer 124a in the post-amplifying unit 104 of the node n1 (100) at the upstream of the transmission path 101. Similarly, the pump light source 115a (see FIG. 1A and FIG. 1B) is not yet connected to the pump light multiplexer 114a in the pre-amplifying unit 103 of the node n2 (100) at the downstream of the transmission path 101.

An add drop multiplexing unit 113a is provided at the pre-stage of the optical amplifier 112 in the pre-amplifying unit 103, and optical reception power detected by a photodetector 113c is output to a controller 113e. An add drop multiplexing unit 113b is also provided at the post-stage of the optical amplifier 112, and optical reception power detected by a photodetector 121d is output to the controller 113e. The controller 113e controls the gain or output of the optical amplifier 112 based on the optical reception power detected by the photodetectors 113c and 113d.

An add drop multiplexing unit 123a is provided at the pre-stage of the optical amplifier 122 in the post-amplifying unit 104, and optical reception power detected by a photodetector 123c is output to a controller 123e. An add drop multiplexing unit 123b is also provided at the post-stage of the optical amplifier 122, and optical reception power detected by a photodetector 123d is output to the controller 123e. The controller 123e controls the gain or output of the optical amplifier 122 based on the optical reception power detected by the photodetectors 123c and 123d.

The optical reception power detected by the photodetector 113c in the pre-amplifying unit 103 provided in the downstream node n2 (100) is also output to the controller 123e in the post-amplifying unit 104 provided in the upstream node n1 (100). With this arrangement, the power of the optical signal that is output from the upstream node n1 (100) can be adjusted according to the attenuation of the optical signal transmitted through the transmission path 101.

Couplers 116 and 126 are connected to between the add drop multiplexing unit 113a and the photodetector 113c of the pre-amplifying unit 103, and between the add drop multiplexing unit 123a and the photodetector 123c of the post-amplifying unit 104 respectively. Photoreceivers that receive optical signals dropped at the upgrading time described later are connected to the couplers 116 and 126 respectively.

Figure 3:
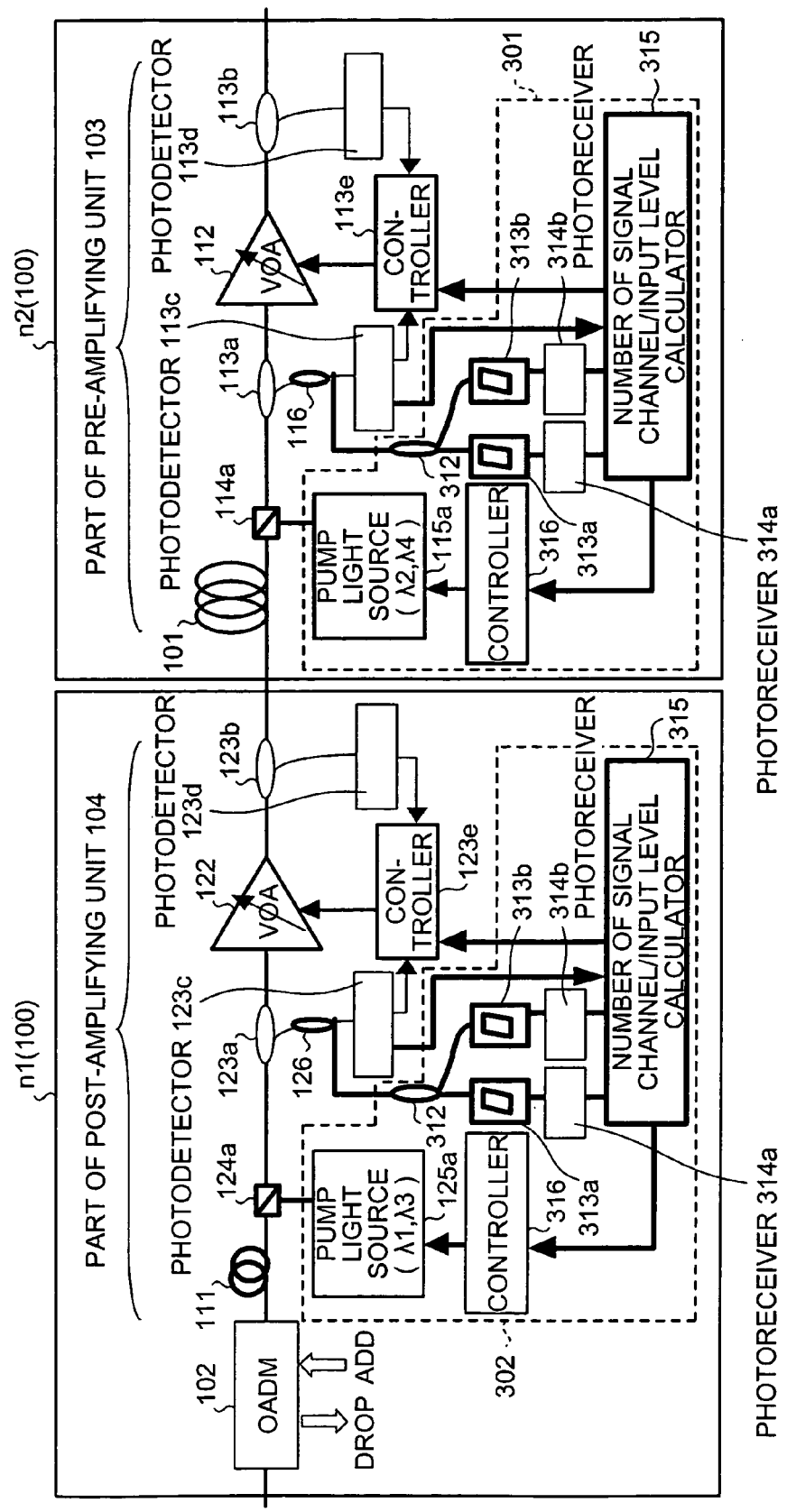
FIG. 3 is a configuration diagram of the optical transmission apparatus at an upgrading time.

FIG. 3 is a configuration diagram of the optical transmission apparatus at the upgrading time. Assume that the OADM system shown in FIG. 1A and FIG. 1B is the system for an intermediate transmission distance at a transmission speed of 10 gigabits per second, for example, at the initial introduction time. Upgrading (functional expansion) is carried out when the transmission distance is increased at the transmission speed of 10 gigabits per second or when the transmission speed is increased to 40 gigabits per second, for example. In FIG. 3, like reference numerals designate like constituent elements as those shown in FIG. 2.

At the upgrading time, an expansion part 301 encircled by a dotted line in FIG. 3 is additionally provided in the pre-amplifying unit 103, and an expansion part 302 encircled by a dotted line in FIG. 3 is additionally provided in the post-amplifying unit 104. These expansion parts 301 and 302 have substantially the same configurations.

The expansion part 302 in the post-amplifying unit 104 is explained below. The pump light source 125a is connected to the pump light multiplexer 124a. The pump light source 125a outputs a pump light of two pump wavelengths ($\lambda 1$ and $\lambda 3$) as backward pump to the pump light multiplexer 124a in the dispersion compensation fiber 111. By outputting the pump light of plural pump wavelengths, the pump light source 125a can obtain wavelength flatness of the gain in the whole signal bands of the optical signal.

Two optical filters 313a and 313b that pass wavelengths of optical signals that are Raman amplified in the pump wavelengths ($\lambda 1$ and $\lambda 3$) of the pump light source 125a, and the photoreceivers 314a and 314b are connected to the coupler 126 via a coupler 312. The pump wavelength $\lambda 1$ is used to Raman amplify a short-wavelength band in the waveband of the optical signal, and the pump wavelength $\lambda 3$ is used to Raman amplify a long-wavelength band in the waveband of the optical signal. The optical filters 313a and 313b have transmission characteristics of interrupting amplified spontaneous emission (ASE) light and passing only the optical signal of the band to be monitored.

Figure 4:
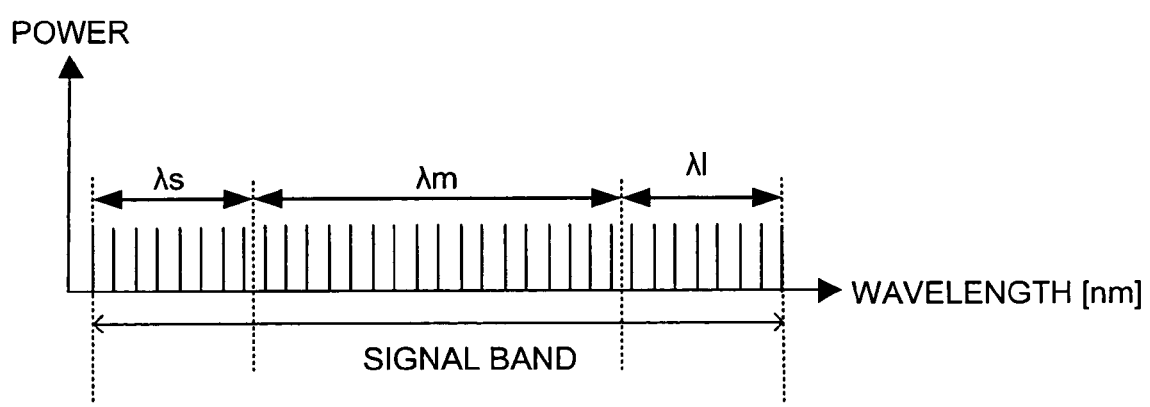
FIG. 4 is a graph for explaining detection of an optical signal in each waveband.

The OSNR is degraded depending on the wavelength characteristic of the optical signal optical power level, such as the amount of tilt. Therefore, a function of monitoring the tilt and controlling the tilt to a predetermined level is necessary. FIG. 4 is a graph for explaining detection of an optical signal in each waveband of the optical signal. The optical signal has a signal band $\lambda$a11 of a predetermined bandwidth, and each of plural channels (for example, 50 channels) has predetermined power. At the upgrading time, the photoreceiver 314a detects power of a short-wavelength band $\lambda$s out of the signal band $\lambda$a11, and the photoreceiver 314b detects power of a long-wavelength band $\lambda 1$. The optical power of a band $\lambda$m other than the short-wavelength band $\lambda$s and the long-wavelength band $\lambda 1$ in the signal band $\lambda$a11 is calculated from the total input optical intensity (total power) detected by the photodetector 123c and values detected by the photoreceivers 314a and 314b. In the present invention, a simple tilt monitor is provided based on this optical circuit configuration.

The power of optical signals of the wavelengths detected by the photoreceivers 314a and 314b and the photodetector 123c is input to a number of signal channel/input level calculator 315. The number of signal channel/input level calculator 315 controls the pump light power of the pump light source 125a for Raman amplification via the controller 316 so that the input light of the optical amplifier 122 at the post-stage of Raman amplification has a predetermined power level and a predetermined wavelength characteristic. The number of signal channel/input level calculator 315 also controls the gain of the optical amplifier 122 via the controller 123e.

The number of signal channel/input level calculator 315 particularly monitors the tilt to control the Raman amplification. In this case, the level of the short-wavelength band λs detected by the photoreceiver 314a and the level of the long-wavelength band λl detected by the photoreceiver 314b have high priority, and the input levels are calculated together with the level of the remaining band λm. In this way, a tilt monitor divides the signal band λa11 into three blocks, thereby making the input to the post-stage optical amplifiers 112 and 122 at a constant power level. Further, stimulated Raman scattering (SRS) generated in the transmission path 101 is compensated for. With this arrangement, the pump light power of the pump light sources 115a and 125a for Raman amplification can be controlled to obtain a predetermined wavelength characteristic.

In the expansion part 301 of the pre-amplifying unit 103, wavelengths (λ2 and λ4) of the pump light of the pump light source 115a for Raman amplifying the optical signal in the transmission path 101 based on a backward pump are different from the pump wavelengths (λ1 and λ3) of the dispersion compensation fiber in the post-amplifying unit 104. The wavelengths (λ1 and λ3) for Raman amplifying the optical signal in the dispersion compensation fiber 111 in the post-amplifying unit 104 and the wavelengths (λ2 and λ4) for Raman amplifying the optical signal in the transmission path 101 in the pre-amplifying unit 103 are set to alternate wavelengths to avoid mutual superimposition of the wavelengths. With this arrangement, the wavelength flatness of the gain in the whole nodes of the pre-amplifying unit 103 and the post-amplifying unit 104 provided in the OADM 102 can be obtained. As explained above, by shifting the pump wavelength so as to avoid the same shape of gain wavelength characteristic in the Raman amplification of optical signals in the nodes n (n1 and n2), the pre-amplifying unit 103 and the post-amplifying unit 104 can mutually compensate for the gain wavelength deviation generated by the Raman amplification. Further, a gain equalizer that compensates for the gain wavelength deviation of the Raman amplification becomes unnecessary.

In the above configuration, active soft edge (ASE) is not detected. However, the photodetectors 113c and 123c directly detect optical signals. At the upgrading time, the photoreceivers 314a and 314b detect the short-wavelength band λs and the long-wavelength band λl that affect the tilt most. With this arrangement, application of expensive optical parts can be minimized. In other words, in the upgrading, the photoreceivers 314a and 314b that detect the short-wavelength band λs and the long-wavelength band λl, and optical filters 313a and 313b that are minimum required are additionally provided.

According to the above configuration, the pump light multiplexers 114a and 124a and the couplers 116 and 126 that drop and multiplex the optical signal are provided at the initial introduction time in advance by assuming that the expansion parts 301 and 302 are connected at the upgrading time. With this arrangement, upgrading in the operation state (in-service upgrading) becomes possible without disconnecting main optical signals during the upgrading. Further, a simple and high-precision tilt monitor can be configured, without using an expensive optical spectrum analyzer.

Figure 5:
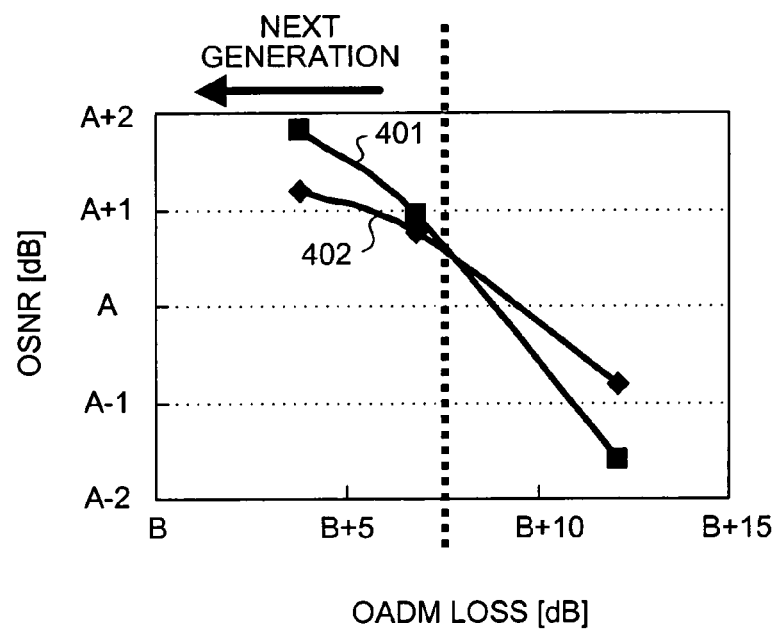
FIG. 5 is a graph of relative values of noise performance between adjacent nodes in the optical transmission apparatus.
Figure 11:
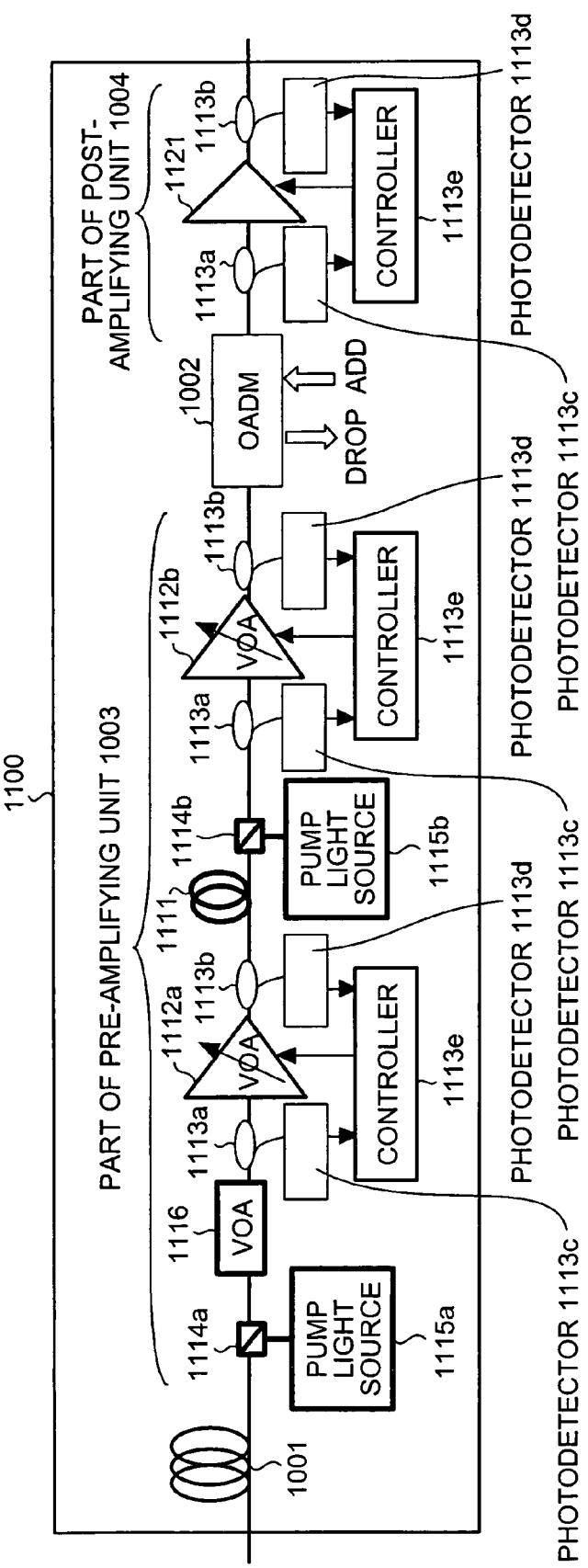
FIG. 11 is a configuration diagram of a conventional optical transmission apparatus in the OADM system.

FIG. 5 is a graph of relative values of noise performance between adjacent nodes in the optical transmission apparatus according to the present invention (see a characteristic line 401). Characteristics obtained from calculation are shown in FIG. 5. The horizontal axis represents the insertion loss [decibel] of the OADM, and the vertical axis represents the OSNR [decibel]. A characteristic line 402 of the OSNR according to the existing (conventional) optical circuit configuration method shown in FIG. 11 is also shown for comparison. It is known that the OSNR improves in the characteristic line 401 according to the present invention as compared with the conventional characteristic line 402, in the area where loss in the OADM is small. When AWGs having a relatively large insertion loss are used, the OSNR according to the conventional technique (as shown in the characteristic line 402) is better than the OSNR according to the present invention (as shown in the characteristic line 401). However, when a low-loss medium such as a wavelength selective switch (WSS) is used for the OADM, the SNR can be improved better by the present invention (as shown in the characteristic line 401). This OADM 1002 cannot improve the OSNR even when the optical amplifier is provided at one stage of the pre-amplifying unit 1003.

For example, when the OSNR is improved by 0.5 decibel, this has basically the same effect that the transmission path 101 having a transmission length of 1,000 kilometers in the OADM system 100 can be increased by 112 kilometers. Therefore, the improvement in the OSNR according to the present invention is important in upgrading the long distance of the transmission path. When the technique is matured in future, reduction in the insertion loss in the OADM 102 and the like is anticipated. Therefore, an effective improvement in the OSNR can be realized by applying the present invention.

Figure 6:
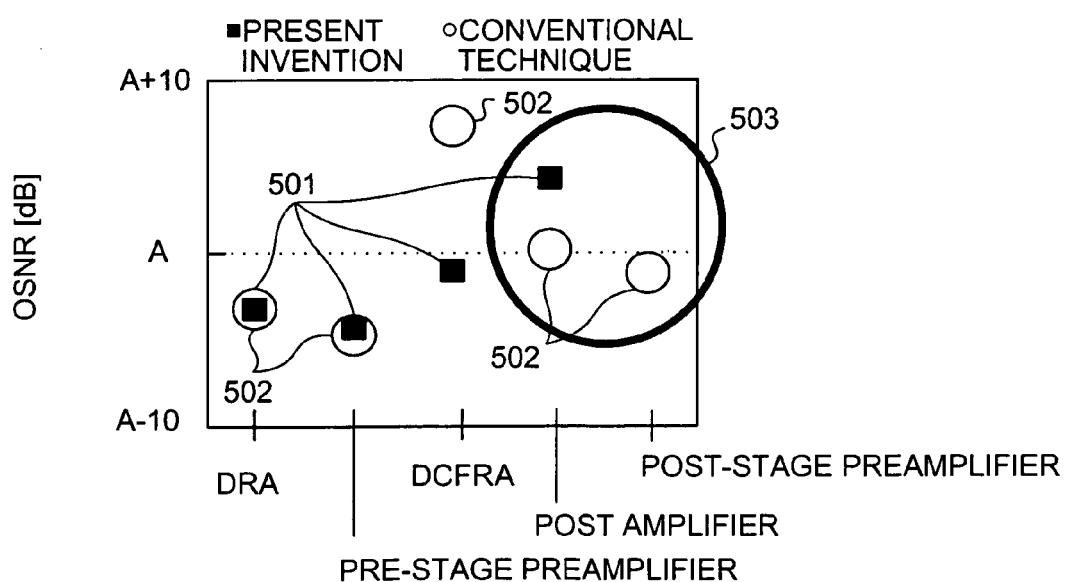
FIG. 6 is a graph of OSNR relative values in the optical transmission apparatus.

FIG. 6 is a graph of OSNR relative values in the optical transmission apparatus according to the present invention. Characteristic measurement points 501 according to the configuration of the present invention (see FIG. 1A) and characteristic measurement points 502 according to the existing configuration (see FIG. 11) are shown in FIG. 6. The horizontal axis represents configurations of the units inside the OADM 102, and the vertical axis represents the OSNR [decibel]. The constituent parts according to the present invention and the constituent parts according to the existing technique are sequentially shown in FIG. 6. The reference numerals 1001 to 1112b of the constituent parts according to the conventional technique are shown in the parentheses below. The technique according to the present invention and the conventional technique provide equivalent characteristic to the Raman amplifier (distributed Raman amplifiers (DRA)) (the pump light source 115a (1115a), etc.) for the transmission path 101 (1001), and the optical amplifier 112 (1112a) at the pre-stage.

However, according to the conventional technique, the OSNR in the Raman amplification in the dispersion compensation fiber 111 (1111) (DCFRA) is extremely larger than the OSNR in other constituent parts. Therefore, this is not effective to improve the OSNR. According to the conventional technique, the post-stage optical amplifier (1112b) is provided additionally. Therefore, an additional noise component is generated, and this degrades the OSNR.

Particularly, as shown in a range 503 in FIG. 6, according to the conventional technique, the OSNR in the optical amplifier (1112b) provided in the post-amplifying unit 104 decreases due to degradation in the transmission characteristic generated in excess of the limit of nonlinearity by the Raman amplification in the dispersion compensation fiber 1111. On the other hand, according to the configuration of the present invention, Raman amplification is carried out in the transmission path 101 in the pre-amplifying unit 103, and Raman amplification is carried out in the dispersion compensation fiber 111 in the post-amplifying unit 104. Therefore, the OSNR in the optical amplifier 122 provided in the post-amplifying unit 104 can be improved. As explained above, according to the present invention, because the dispersion compensation fiber 111 is disposed at a position of small input power, the limit of nonlinearity can be solved, as compared with the conventional technique. Accordingly, gain of Raman amplification using the dispersion compensation fiber 111 (DCFRA) can be increased. Consequently, the OSNR in the post-amplifying unit 104 can be improved. Further, according to the present invention, the optical amplifier (1112b) at the post-stage of the pre-amplifying unit (1003) used in the conventional technique can be omitted. Therefore, the noise component can be reduced correspondingly.

The optical power in the section from the input (In) of the transmission path 101 to the output (out) of the OADM 102 has no difference attributable to the difference between the configuration according to the present invention and the configuration according to the conventional technique. However, the optical power of the input to the post-amplifying unit 1004 (the optical amplifier 1121) according to the conventional technique decreases as compared with the optical power of the input to the post-amplifying unit 104 (the optical amplifier 122) according to the present invention.

As explained above, according to the configuration of the present invention, there are following three advantages. First, the OSNR can be improved under the condition of reduction in the insertion loss in a device that forms a node such as the OADM 102. Second, cost of parts can be reduced. The cost reduction is attributable to a simple configuration as compared with the configuration according to the conventional technique. While the optical amplifier 1112b (see FIG. 11) at the post-stage of the pre-amplifying unit 103 is necessary in the configuration according to the conventional technique, this optical amplifier can be omitted according to the present invention. While the output of the optical amplifier 1112a at the pre-stage needs to be increased in the configuration according to the conventional technique, the output does not need to be increased in the configuration according to the present invention. Third, the nonlinearity phase shift according to the present invention can be decreased (to about a half or less), as compared with the decrease in the configuration according to the conventional technique. Further, degradation in transmission characteristics due to nonlinearity can be sufficiently avoided.

As explained above, according to the present invention, based on the application of the WSS, insertion loss in the OADM 102 is decreased. By using this configuration, the dispersion compensation fiber 111 is disposed as the load in the post-amplifying unit 104. With this arrangement, the OSNR can be set substantially the same as that according to the conventional configuration. At the same time, the configuration of the pre-amplifying unit 103 can be simplified (the number of optical amplifiers can be decreased). At the upgrading time, Raman amplification can be achieved both in the pre-amplifying unit 103 and the post-amplifying unit 104, thereby effectively increasing the OSNR.

Figure 7:
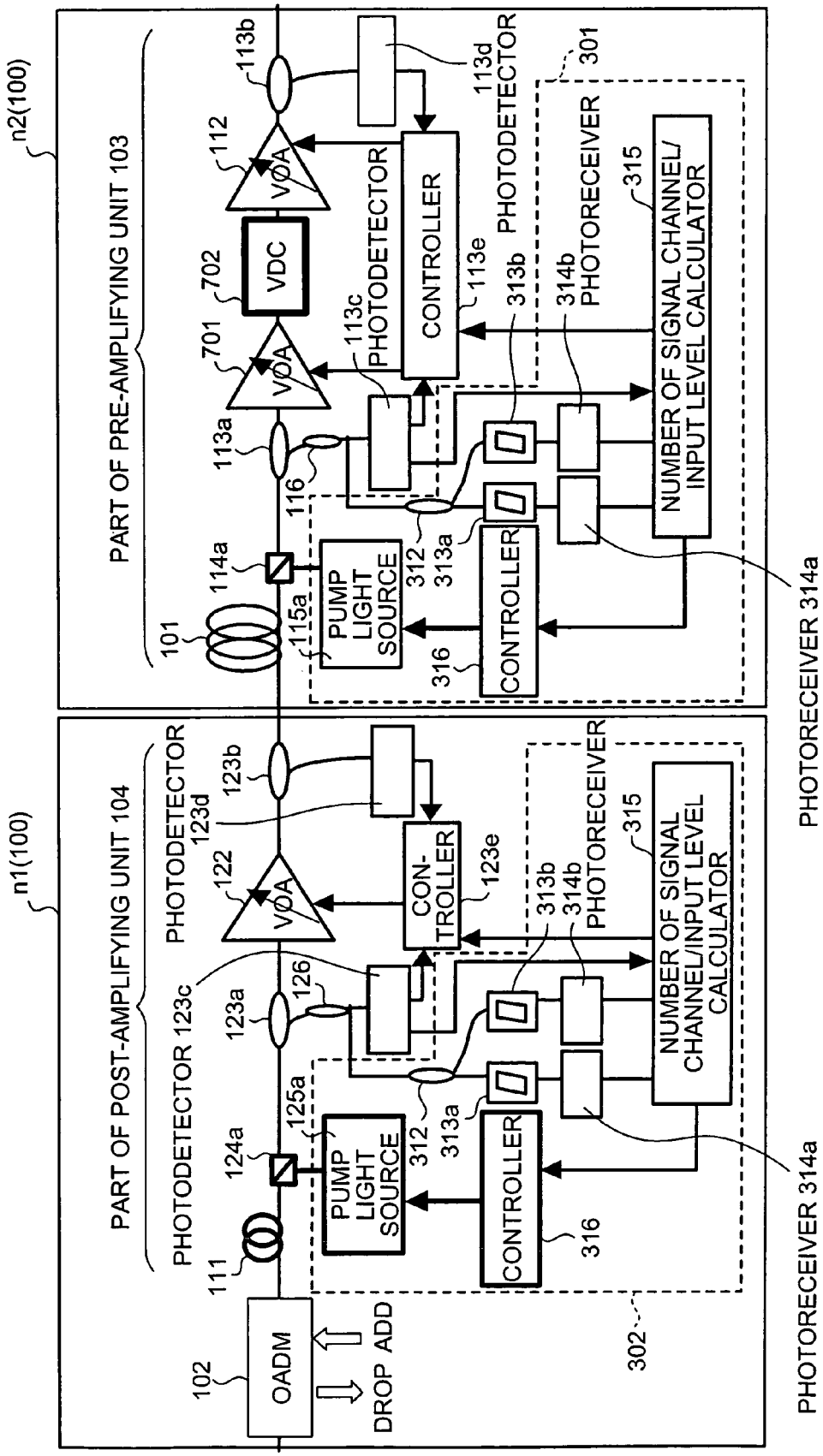
FIG. 7 is a configuration diagram of an optical transmission apparatus according to a second embodiment of the present invention.

FIG. 7 is a configuration diagram of an optical transmission apparatus according to a second embodiment of the present invention. In FIG. 7, like reference numerals designate like constituent parts as those in the first embodiment shown in FIG. 3.

In the second embodiment, at the upgrading time, the expansion part 301 is additionally provided in the pre-amplifying unit 103, and the expansion part 302 is additionally provided in the post-amplifying unit 104, in a similar manner to that shown in FIG. 3. Further, at the upgrading time, the optical amplifier in the pre-amplifying unit 103 has two stages. An optical amplifier 701 is additionally provided at the pre-stage of the optical amplifier 112 disposed at the initial introduction time, and a variable dispersion compensator (VDC) 702 is disposed between the pair of optical amplifiers 701 and 112.

The VDC 702 is effective to decrease the menu of the dispersion compensation fiber 111. However, the VDC 702 as a single unit has a limit to dispersion that can be compensated for. When the transmission path 101 has a long distance, the VDC 702 as a single unit cannot achieve a required level of dispersion compensation. Therefore, the dispersion compensation fiber 111 that compensates for a fixed level of dispersion is also used. The VDC 702 compensates for only a variable required level of dispersion.

According to the second embodiment, Raman amplification in the dispersion compensation fiber 111 is also carried out in the post-amplifying unit 104, like in the first embodiment (see FIG. 3). Accordingly, the OSNR can be effectively increased. Insertion loss is large (about 10 decibel) in the VDC 702. Therefore, the pre-amplifying unit 103 has the optical amplifiers 701 and 112 at two stages. The VDC 702 is disposed between these optical amplifiers, thereby avoiding degradation in the OSNR due to the insertion loss in the VDC 702. As explained above, according to the second embodiment, the optical circuit configuration referred to in the present invention can be also applied to the OADM system of the next generation having the VDC 702.

Figure 8:
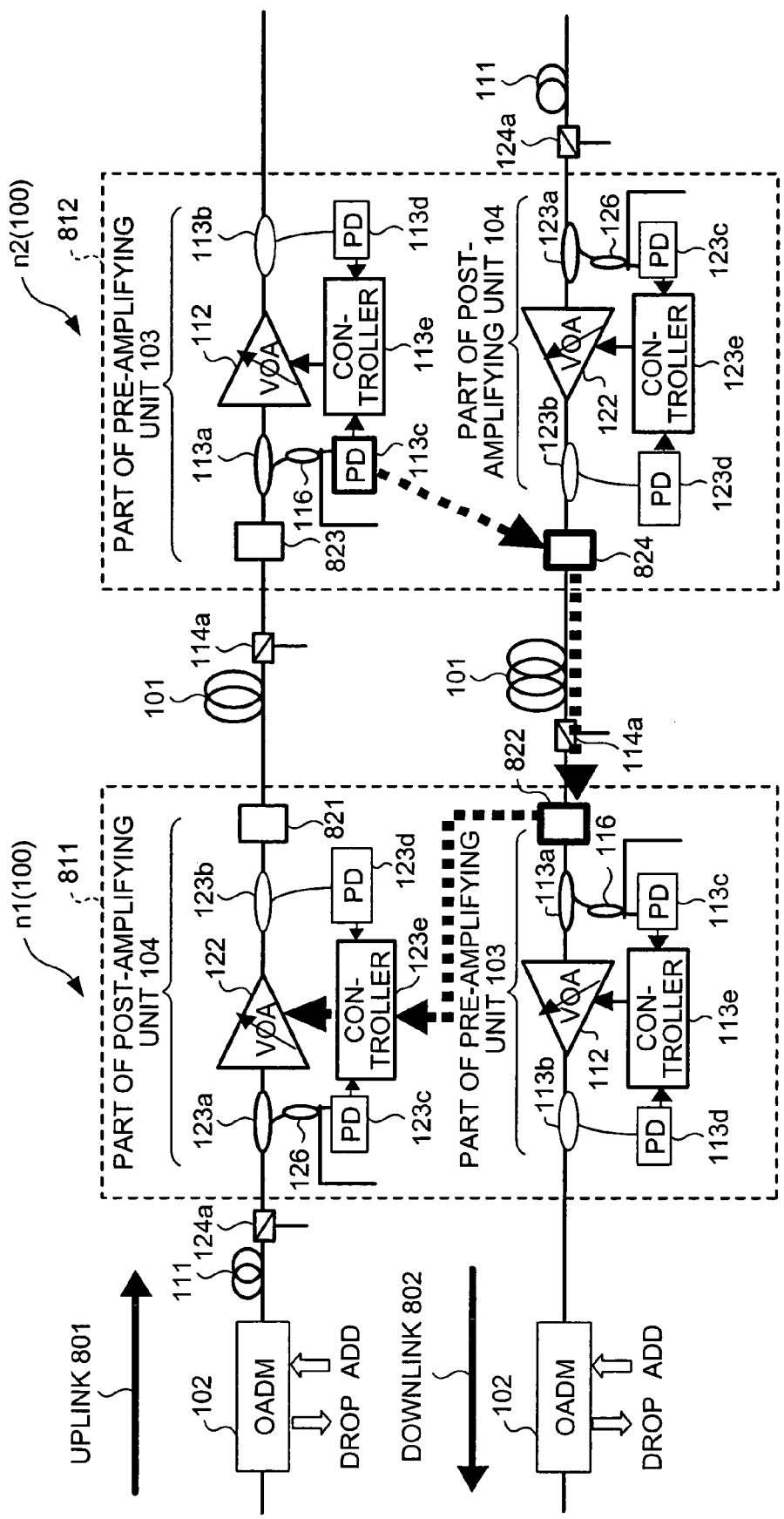
FIG. 8 is a configuration diagram of an optical transmission apparatus according to a third embodiment of the present invention.

FIG. 8 is a configuration diagram of an optical transmission apparatus according to a third embodiment of the present invention. In FIG. 8, like reference numerals designate like constituent parts as those in the first embodiment shown in FIG. 3. In FIG. 8, the configurations of the expansion parts 301 and 302 at the upgrading time explained in the first embodiment are omitted. An uplink 801 and a downlink 802 are shown in FIG. 8.

According to the third, the level of light input to the pre-amplifying unit 103 is made constant regardless of the length of the transmission path 101. Specifically, power input to the pre-amplifying unit 103 via the transmission path 101 of the uplink 801 is detected. A control signal corresponding to the information of the detected power is transmitted using an optical supervisory channel (OSC) of the downlink 802, thereby controlling the gain or output of the optical amplifier 122 in the post-amplifying unit 104 on the uplink 801 to make constant the power input to the pre-amplifying unit 103 on the uplink 801.

An amplifying unit 1 (811) includes the post-amplifying unit 104 disposed on the uplink 801, and the pre-amplifying unit 103 disposed on the downlink 802. An OSC coupler 821 that adds or drops the OSC signal is provided at the output end in the post-amplifying unit 104 on the uplink 801. An OSC coupler 822 that adds or drops the OSC signal is provided at the input end of the pre-amplifying unit 103 on the downlink 802. The optical amplifier 122 provided in the amplifying unit 1 (811) has a function of changing the gain.

An amplifying unit 2 (812) includes the pre-amplifying unit 103 disposed on the uplink 801, and the post-amplifying unit 104 disposed on the downlink 802. An OSC coupler 823 that adds or drops the OSC signal is provided at the input end of the pre-amplifying unit 103 on the uplink 801. An OSC coupler 824 that adds or drops the OSC signal is provided at the output end of the post-amplifying unit 104 on the downlink 802.

As shown in FIG. 8, the photodetector (PD) 113c provided in the amplifying unit 2 (812) on the uplink 801 detects power of the optical signal input to the pre-amplifying unit 103. The information of the detected power is set as an OSC signal, and is transmitted to the amplifying unit 1 (811) using the OSC in the transmission path 101 via the OSC coupler 824 provided on the downlink 802.

In the amplifying unit 1 (811), the OSC coupler 822 drops the OSC signal using the OSC on the transmission path 101, and inputs the OSC signal to a controller 123e in the post-amplifying unit 104. The controller 123e controls the gain of the optical amplifier 122 based on the power information contained in the OSC signal. With this arrangement, even when the length of the transmission path 101 changes, the gain in the post-amplifying unit 104 can be controlled by matching the length of the transmission path, and the level of the optical signal input to the optical amplifier 112 in the pre-amplifying unit 103 at the downstream of the transmission path 101 can be made constant.

Particularly, when the transmission path 101 between the upstream node n1 (100) and the downstream node n2 (100) has a short length, the gain of the optical amplifier 122 in the post-amplifying unit 104 in the upstream node n1 (100) is decreased (the output power is decreased), thereby making constant the level of the optical signal input to the optical amplifier 112 in the pre-amplifying unit 103 at the downstream of the transmission path 101. By adjusting the gain of the optical amplifier 122 in the post-amplifying unit 104, loss and gain in the dispersion compensation fiber 111 can be absorbed (adjusted).

According to the configuration of the third embodiment, the number of menus of the optical amplifier 112 in the pre-amplifying unit 103 provided in the node n1 (100) at the downstream of the transmission path 101 can be decreased. At the same time, degradation in the OSNR can be avoided. The number of menus means the number of optical amplifiers 112 having different configurations corresponding to characteristics (for example, an input range) of the optical amplifier 112. Optical amplifiers 112 having characteristics suitable for the layout positions are selected. The optical amplifiers 112 as well as plural photodetectors 113c having different characteristics depending on the detection range of input level are necessary as for the number of menus. According to the configuration of the third embodiment, the level of the optical signal input to the optical amplifier 112 in the pre-amplifying unit 103 can be made constant, regardless of the length of the transmission path 101. Therefore, it is not necessary to selectively dispose the optical amplifier 112 having a characteristic corresponding to the length of the transmission path 101, thereby saving time and labor.

As explained above, according to the third embodiment, the power of the optical signal input to the pre-amplifying unit 103 in the node n (n2) at the downstream of the transmission path 101 is monitored using the up and down OSC links, thereby controlling the optical amplifier 122 in the post-amplifying unit 104 in the node n (n1) at the upstream of the transmission path 101 to automatically adjust the output of the post-amplifying unit 104.

Figure 9:
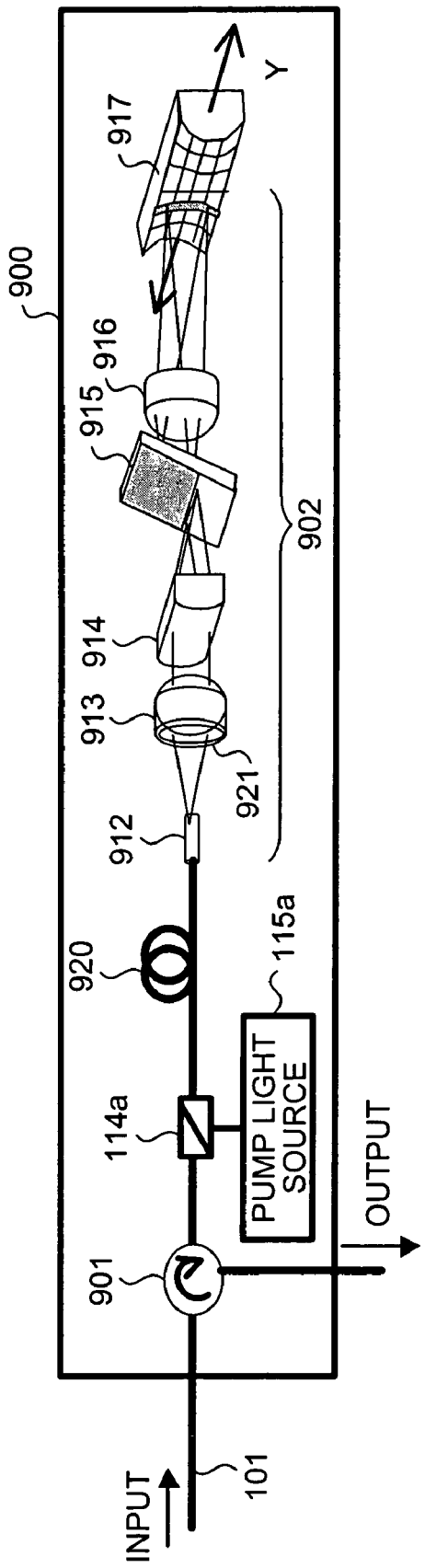
FIG. 9 is a configuration diagram of an optical transmission apparatus according to a fourth embodiment of the present invention.

FIG. 9 is a configuration diagram of an optical transmission apparatus according to a fourth embodiment of the present invention. In the fourth embodiment, another application example of the VDC 702 explained in the second embodiment (see FIG. 7) is explained.

In FIG. 9, a VDC 900 includes an optical circulator 901 and a variable dispersion compensating unit 902 disposed at the input side of the optical signal, as a general configuration. The variable dispersion compensating unit 902 includes an output end (ferule) 912 of the transmission path 101, a collimating lens 913, a line focusing lens 914, a chromatic dispersion element (a virtually imaged phased array (VIPA)) 915, a focusing lens 916, and a three-dimensional mirror 917, in this order from the input side. The chromatic dispersion element 915 emits the optical signal in up and down directions at an emission angle different for each wavelength. When the three-dimensional mirror 917 is moved in a lateral direction (a Y direction) in FIG. 9, the chromatic dispersion for each wavelength can be changed.

The pump light multiplexer 114a (see FIG. 1A) and an optical amplification medium 920 are provided on the optical path between an optical circulator 901 and the variable dispersion compensating unit 902 provided on the VDC 900. A pump light reflection medium 921 that passes the optical signal and highly reflects the pump light is provided in the variable dispersion compensating unit 902 on the optical path. The optical amplification medium 920 can be configured by the dispersion compensation fiber 111 (see FIG. 1A), a rare-earth doped fiber, a silica-based high nonlinear fiber, a high refractive index glass fiber, or the like. The pump light reflection medium 921 can be formed by depositing a film on the incident surface of the collimating lens 913.

According to the configuration of the fourth embodiment, the pump light reflection medium 921 can reflect the pump light to the optical amplification medium 920, thereby improving the efficiency of gain. When an EDF is used for the optical amplification medium 920, a gain equalizer (GEQ) and an ASE cut filter are provided between the optical amplification medium 920 and the variable dispersion compensating unit 902. With this arrangement, degradation in noise figure (NF) due to the ASE generated in the direction opposite to the direction of the gain wavelength deviation can be suppressed. The VDC 900 has substantially no variation in insertion loss. When a rare-earth doped fiber is used, gain wavelength characteristic does not change. While the conventional VDC 702 has isolators at the input side and the output side of the optical signal respectively, according to the above configuration, the optical circulator 901 can implement the function of the isolators. As explained above, according to the VDC 900 of the fourth embodiment, the number of parts can be reduced, the device can be made small, and cost can be reduced.

The present invention can be also applied to a hub and an optical transmission system including an optical cross connector (OXC) as well as the system including the OADM. The present invention can support the decrease of insertion loss in the OADM and the increase in the length of the transmission path 101 that are promoted in the metro system in recent years, and can improve the OSNR as compared with the improvement by the conventional method.

According to the present invention, the initial introduction cost can be decreased, and the function can be flexibly expanded to meet the increase in the length of the transmission path or the increase in the capacity. When the function is expanded, degradation in transmission characteristics due to nonlinearity can be avoided. Therefore, gain by Raman amplification in the dispersion compensation fiber can be increased. Accordingly, the OSNR can be improved (increased) effectively, and the function can be expanded at low cost.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical transmission apparatus with an optical add drop multiplexer (OADM) that adds/drops an optical signal to/from a transmission path, the optical transmission-apparatus comprising:

a pump light multiplexer that is located downstream of the OADM on the transmission path;

a dispersion compensation fiber that is located downstream of the OADM on the transmission path;
an optical amplifier; and
a first detector for detecting a total intensity of an optical signal input to the optical amplifier, the optical signal including short-wavelength signals, medium-wavelength signals, and long-wavelength signals, wherein
the optical transmission apparatus is configured to house
a pump light source connectable to the pump light multiplexer to Raman amplify an optical signal in the dispersion compensation fiber;
a second detector that detects an intensity of the short-wavelength signals;
a third detector that detects an intensity of the long-wavelength signals; and
a controller that calculates an intensity of the medium-wavelength signals based on the total intensity, the intensity of the short-wavelength signals, and the intensity of the long-wavelength signals, and that controls the pump light source to maintain the total intensity of the optical signal and wavelength characteristics of the optical signal.

2. An optical transmission apparatus comprising:
an optical add drop multiplexer (OADM) that adds/drops an optical signal to/from a transmission path;
a pre-amplifying unit that is located upstream of the OADM on the transmission path and includes a first pump light multiplexer; and
a post-amplifying unit that is located downstream of the OADM on the transmission path and includes a second pump light multiplexer and a dispersion compensation fiber, wherein
the pre-amplifying unit is configured to house a first pump light source connectable to the first pump light multiplexer to Raman amplify an optical signal on the transmission path,
the post-amplifying unit is configured to house a second pump light source connectable to the second pump light multiplexer to Raman amplify an optical signal in the dispersion compensation fiber,
each of the pre-amplifying unit and the post-amplifying unit includes an optical amplifier and a first detector for detecting a total intensity of an optical signal input to the optical amplifier, the optical signal including short-wavelength signals, medium-wavelength signals, and long-wavelength signals, and
each of the pre-amplifying unit and the post-amplifying unit is configured to house
a second detector that detects an intensity of the short-wavelength signals;
a third detector that detects an intensity of the long-wavelength signals; and
a controller that calculates an intensity of the medium-wavelength signals based on the total intensity, the intensity of the short-wavelength signals, and the intensity of the long-wavelength signals, and that controls the pump light source to maintain the total intensity of the optical signal and wavelength characteristics of the optical signal.

3. The optical transmission apparatus according to claim 2, wherein the OADM includes a wavelength selective switch.

4. The optical transmission apparatus according to claim 2, wherein the post-amplifying unit further includes a variable light attenuator.

5. The optical transmission apparatus according to claim 2, wherein the pre-amplifying unit further includes two optical amplifiers and a variable dispersion compensator that is located between the optical amplifiers.

6. The optical transmission apparatus according to claim 5, wherein the variable dispersion compensator includes:
an optical amplification medium that amplifies a pump light from a pump light source; and
a pump light reflection medium that reflects the pump light amplified by the optical amplification medium to the optical amplification medium.

7. The optical transmission apparatus according to claim 6, wherein the optical amplification medium is configured by any one of a rare-earth doped fiber, a dispersion compensation fiber, a silica-based high nonlinear fiber, and a high refractive index glass fiber.

8. The optical transmission apparatus according to claim 2, wherein the controller calculates the intensity of the medium-wavelength signals based on the total intensity, a weighted intensity of the short-wavelength signals, and a weighted intensity of the long-wavelength signals.

9. The optical transmission apparatus according to claim 2, wherein
the second detector includes
a first optical filter that passes the short-wavelength signals;
a first photoreceiver that detects the short-wavelength signals that has passed through the first optical filter; and
the third detector includes
a second optical filter that passes the long-wavelength signals; and
a second photoreceiver that detects the long-wavelength signals that has passed through the second optical filter.

10. The optical transmission apparatus according to claim 9, wherein each of the first optical filter and the second optical filter is a fiber grating.

11. The optical transmission apparatus according to claim 2, wherein the first pump light source and the second pump light source output pump lights of different wavelengths.

12. The optical transmission apparatus according to claim 2, wherein each of the first pump light source and the second pump light source outputs a plurality of pump lights of different wavelengths.

13. The optical transmission apparatus according to claim 2, wherein
when the optical transmission apparatus is located downstream of the transmission path,
the pre-amplifying unit is located on an uplink of the transmission path and includes a detector that detects an intensity of the optical signal, and
the post-amplifying unit is located on an downlink of the transmission path and includes a first optical supervisory channel (OSC) coupler that transmits an OSC signal including the intensity to another optical transmission apparatus located upstream of the transmission path, and
when the optical transmission apparatus is located upstream of the transmission path,
the pre-amplifying unit is located on the downlink of the transmission path and includes a second OSC coupler that drops the OSC signal transmitted from the first OSC coupler of another optical transmission apparatus located downstream of the transmission path, and
the post-amplifying unit is located on the uplink of the transmission path and includes a controller that controls an intensity of an optical signal output from the optical transmission apparatus to the another optical transmission apparatus located downstream of the transmission path based on the intensity included in the OSC signal.

14. The optical transmission apparatus according to claim 13, wherein when the optical transmission apparatus is located upstream of the transmission path, the post-amplifying unit has a variable attenuation function and changes the intensity of the optical signal output from the optical transmission apparatus to the another optical transmission apparatus according to a control of the controller.

15. An optical transmission apparatus with an optical add drop multiplexer (OADM) that adds/drops an optical signal to/from a transmission path, the optical transmission-apparatus comprising:
 a pump light multiplexer that is located downstream of the OADM on the transmission path and to which a pump light source is to be connected when the optical transmission apparatus is upgraded;
 a dispersion compensation fiber that is located downstream of the OADM on the transmission path;
 an optical amplifier; and
 a first detector for detecting a total intensity of an optical signal input to the optical amplifier, the optical signal including short-wavelength signals, medium-wavelength signals, and long-wavelength signals, wherein
 the optical transmission apparatus is configured to house the pump light source for Raman amplification of an optical signal in the dispersion compensation fiber;
 a second detector that detects an intensity of the short-wavelength signals;
 a third detector that detects an intensity of the long-wavelength signals; and
 a controller that calculates an intensity of the medium-wavelength signals based on the total intensity, the intensity of the short-wavelength signals, and the intensity of the long-wavelength signals, and that controls the pump light source to maintain the total intensity of the optical signal and wavelength characteristics of the optical signal.

* * * * *